United States Patent
Gottschald et al.

(10) Patent No.: US 6,749,377 B2
(45) Date of Patent: Jun. 15, 2004

(54) PROCESS FOR EDGE-MACHINING OF OPTICAL LENSES

(75) Inventors: Lutz Gottschald, Meerbusch (DE); Jochen Wagner, Asslar (DE)

(73) Assignee: Loh Optikmaschinen AG (DE)

(*) Notice: Subject to any disclaimer, the term of this patent is extended or adjusted under 35 U.S.C. 154(b) by 30 days.

(21) Appl. No.: 10/123,060

(22) Filed: Apr. 15, 2002

(65) Prior Publication Data

US 2002/0176756 A1 Nov. 28, 2002

(30) Foreign Application Priority Data

Apr. 20, 2001 (DE) .......................... 101 19 662

(51) Int. Cl.$^7$ ............... B23C 3/12; B23C 1/14; B24B 1/00; B24B 9/14
(52) U.S. Cl. ............ 409/132; 409/138; 409/136; 409/166; 409/188; 409/195; 409/198; 451/43; 451/6; 356/623
(58) Field of Search ............... 409/132, 131, 409/147, 149, 136, 165, 166, 168, 188, 186, 195, 193, 198, 138; 451/43, 6, 255, 256; 356/623

(56) References Cited

U.S. PATENT DOCUMENTS

| | | | |
|---|---|---|---|
| 4,964,239 A | * 10/1990 | Gottschald et al. | ............ 451/9 |
| 5,908,348 A | 6/1999 | Gottschald | |
| 6,122,063 A | 9/2000 | Berndt et al. | |
| 6,283,825 B1 | * 9/2001 | Ulloa | ............ 451/43 |
| 6,336,057 B1 | * 1/2002 | Obayashi | ............ 451/43 |
| 6,508,692 B2 | * 1/2003 | Gottschalk | ............ 451/43 |
| 6,544,102 B2 | * 4/2003 | Schafer et al. | ............ 451/43 |
| 6,564,111 B1 | * 5/2003 | Gottschald | ............ 409/138 |
| 2002/0149862 A1 | * 10/2002 | Wallendorf et al. | ......... 359/808 |
| 2002/0168920 A1 | * 11/2002 | Wallendorf et al. | ........... 451/5 |

FOREIGN PATENT DOCUMENTS

| | | |
|---|---|---|
| DE | 3827122 A1 * | 2/1990 |
| DE | 197 27 226 A1 | 10/1998 |
| DE | 197 02 287 C2 | 2/1999 |
| DE | 198 04 542 C2 | 11/2000 |
| EP | 0 160 985 A2 | 11/1985 |
| WO | WO-00/03839 A1 * | 1/2000 |

* cited by examiner

Primary Examiner—A. L. Wellington
Assistant Examiner—Erica E Cadugan
(74) Attorney, Agent, or Firm—McAndrews, Held & Malloy, Ltd.

(57) ABSTRACT

A process for edge-machining an optical (spectacle) lens including preliminary machining of an edge of the lens rotatable in controlled manner about a rotational axis of a workpiece by a first edge-machining tool adjustable radially relative to the rotational axis of the workpiece, whereby the lens is given a circumferential contour which corresponds to the circumferential contour of a lens holder apart from a slight degree of oversizing, contactless measurement of the preliminarily machined lens edge, and finish-machining of the lens edge, taking account of the detected edge data of the preliminarily machined lens, by means of a second edge-machining tool adjustable radially relative to the rotational axis of the workpiece, whereby the lens is provided with a circumferential contour substantially complementary to the circumferential contour of the lens holder. During preliminary machining of the lens edge, an edge surface which is definedly matt in the dry state is produced and then the dry or dried surface is measured by means of a measuring arrangement comprising a laser and a video camera and operating in a particular way without contact, in order to determine the edge data of the preliminarily machined lens with increased accuracy and markedly quicker than hitherto.

14 Claims, 3 Drawing Sheets

PROCESS FOR EDGE-MACHINING OF OPTICAL LENSES

BACKGROUND OF THE INVENTION

The present invention relates to a process for edge-machining an optical lens.

In particular, the invention relates to a process for edge-machining spectacle lenses, which allows spectacle lenses to be finished at the edge with the necessary precision in very short machining times.

Where the term spectacle lenses is used below, it should be understood to mean optical lenses or lens blanks for spectacles made of the usual materials, i.e. inorganic glass or plastics, such as polycarbonate, CR-39, HI-Index etc., and with circumferential edges of any shape, which lenses or lens blanks may be, but do not have to be, machined on one or both optically effective surfaces prior to machining of the edge thereof.

The purpose of spectacle lens edge machining is to machine the edge of a spectacle lens so that it is ready for insertion into a spectacle frame. To this end, the spectacle lens is on the one hand provided, when viewed in plan, with a circumferential contour which is substantially complementary to the circumferential contour of the holder, i.e. the circumferential contour of the spectacle frame. On the other hand it may be necessary, depending on the type of holder, to form a groove or bevel at the spectacle lens edge, which serves for form-fitting securing of the spectacle lens to the spectacle frame. To ensure that the spectacle lens fits into the spectacle frame after edge-machining, or to be able to determine the position of the groove or bevel on the spectacle lens edge, the edge of the spectacle lens is measured after a preliminary machining stage, which is generally performed with cooling liquid feed, and then finish-machined taking account of the measured edge data, optionally with formation of the groove or bevel.

DESCRIPTION OF THE PRIOR ART

DE-A-38 27 122 discloses a process for edge-machining a spectacle lens, which comprises the following stages:

preliminary machining of an edge of the spectacle lens rotatable in an angularly controlled manner about a rotational axis of a workpiece by means of a first edge-machining tool adjustable radially relative to the rotational axis of the workpiece, wherein the spectacle lens is provided with a circumferential contour which corresponds to the circumferential contour of a holder for the spectacle lens apart from a slight degree of oversizing, contactless measurement of the edge of the preliminarily machined spectacle lens and finish-machining of the edge of the spectacle lens, taking account of the detected edge data of the preliminarily machined spectacle lens, by means of a second edge-machining tool adjustable radially relative to the rotational axis of the workpiece, wherein the spectacle lens is provided with a circumferential contour substantially complementary to the circumferential contour of the holder.

Although this edge-machining process exhibits advantages in comparison to other previously known processes (e.g. EP-A-0 160 985), in which the edge data of the preliminarily machined spectacle lens are mechanically scanned to obtain information for finishing of the spectacle lens edge, said advantages being to the effect that, due to the contactless measuring arrangement, damage to the spectacle lens/measuring arrangement and/or movements or deformation thereof during measurement which might falsify the measuring results are prevented, a disadvantage of this prior art is in particular that it did not always prove possible to detect reliably or within acceptable time limits the edge data of the preliminarily machined spectacle lens using the measurement principles described in DE-A-38 27 122. Further measurement arrangements, which use a VCR-System or a Laser-Scanning-System for contactless scanning of the edge of a machined spectacle lens, are known from DE-A-198 04 542 and DE-A-197 02 287, respectively.

In relation to the above prior art, the object of the invention is to provide a process for edge-machining optical lenses which is improved in particular with regard to machining speed and precision.

SUMMARY OF THE INVENTION

According to the present invention, there is provided a method of edge-machining an edge of an optical lens, in particular a spectacle lens, which is rotatable in an angularly controlled manner about a rotational axis of a workpiece to form the lens, the method comprising the steps:

preliminary machining of the edge of the lens by means of a first edge-machining tool that is adjustable at least radially relative to the rotational axis of the workpiece, wherein the lens is provided with a circumferential contour which corresponds to a circumferential contour of a holder for the lens apart from a slight degree of oversizing, contactless measurement of the edge of the preliminarily machined lens, and finish-machining of the edge of the lens, taking account of the detected edge data for the preliminarily machined lens, by means of a second edge-machining tool that is adjustable at least radially relative to the rotational axis of the workpiece, wherein the lens is provided with a circumferential contour substantially complementary to the circumferential contour of the holder, wherein, during preliminary machining of the edge of the lens, a surface which is definedly matt in the dry state is produced at the edge, wherein, if preliminary machining of the edge of the lens is performed with cooling liquid supply, at least the edge of the preliminarily machined lens is dried before the edge is measured, and wherein, to measure the edge, a bundle of laser beams is directed towards the dry, definedly matt surface of the edge by means of a laser in a predetermined positional relationship to the rotational axis of the workpiece, and an image of the point of impact of the laser beams is recorded by means of a video camera in a predetermined positional relationship to the rotational axis of the workpiece, wherein the recorded image is then evaluated with respect to a distance of the point of impact from the rotational axis of the workpiece, in order to determine the edge data of the preliminarily machined lens.

The basis for the invention is the idea that it would be particularly desirable, in order to accelerate the edge-machining of lenses, to reduce the nonproductive times, i.e. the times during which no shaping machining occurs between the respective edge-machining tool and the lens edge. In this respect, it has emerged that, due to the procedure according to the invention, which is fundamentally geared to measuring the dry or dried, definedly matt surface of the edge of the preliminarily machined lens by means of a measuring arrangement consisting of laser and video camera and operating in a particular way without contact, the edge data of the preliminarily machined lens may be determined with increased accuracy markedly more quickly than was previously possible, such that the nonproductive times required therefor may be reduced considerably relative to the prior art.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENT

Figure 1:
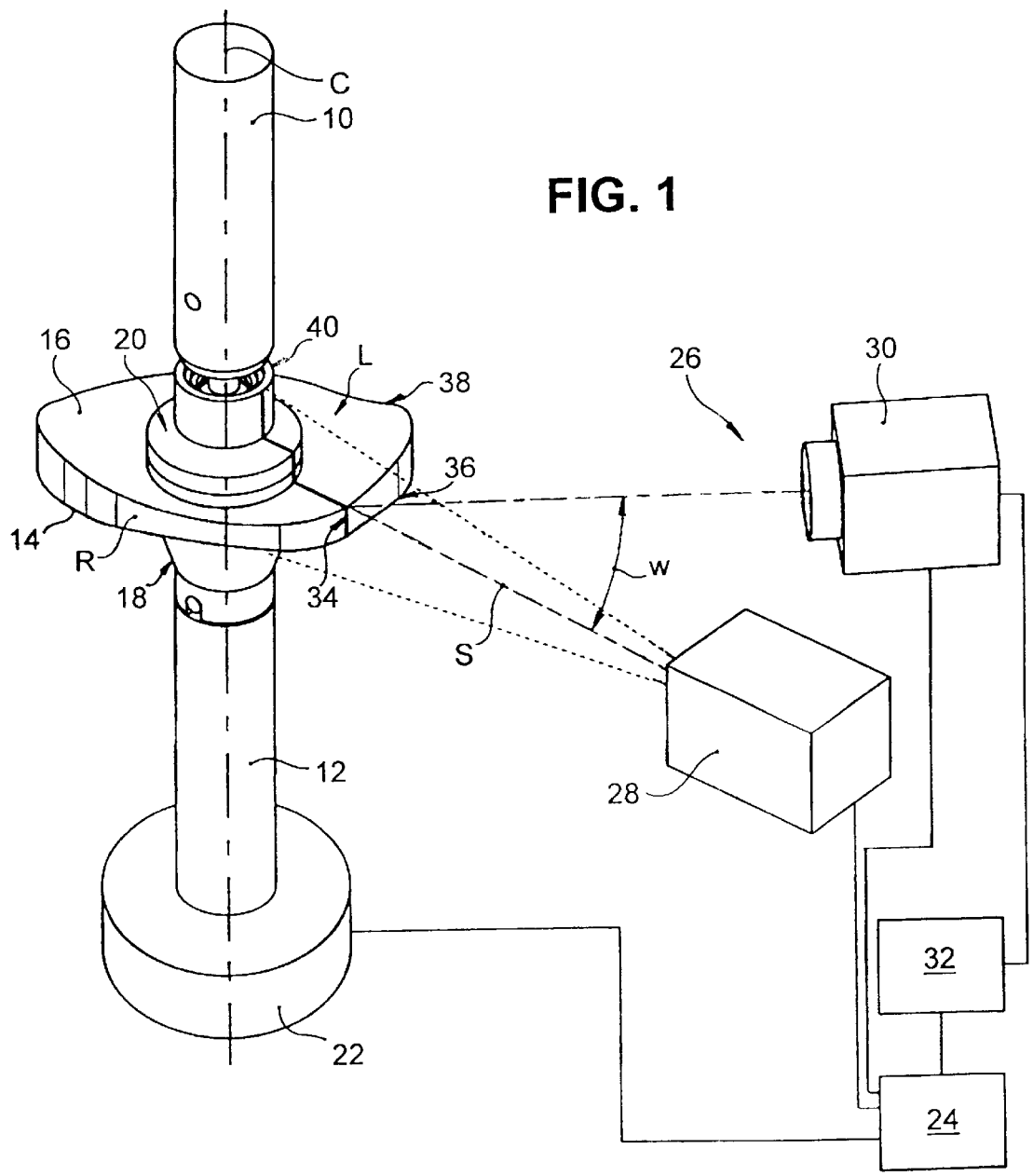
FIG. 1 is a perspective view of a spectacle lens clamped between two holding shafts and preliminarily edge-machined, as well as of a measuring arrangement comprising a laser and a video camera and operating in contactless manner for detecting the edge data of the preliminarily machined spectacle lens during the edge-machining process.

FIG. 1 shows an optical lens L in the form of a spectacle lens, which is clamped, for machining of the edge R thereof, between two axially aligned holding shafts 10, 12, illustrated only schematically, which are synchronously rotatable about a CNC-controlled, vertical rotational workpiece axis C and adjustable axially relative to one another to clamp the lens L. The holding shafts 10, 12 are components of a workpiece driving and clamping device, not shown in any more detail, which may be constructed in principle as disclosed in DE-A-100 08 710 or US-A-2001/0031606 of the applicant, incorporated herein by reference.

Between the mutually facing ends of the holding shafts 10, 12, the lens L is held by means of an arrangement for securing and clamping the lens L described in detail in the applicant's prior German patent application 101 14 238.2, which arrangement comprises a securing member attachable detachably to a lower, optically effective surface 14 of the lens L, an adapter for the securing member, which is connectable rigidly to the lower holding shaft 12 and which is constructed for angle of rotation-oriented rotary drive of the securing member, and a clamping assembly, which comprises a fastening portion connectable rigidly to the upper holding shaft 10 and a clamping portion connected angularly movably therewith, which clamping portion is constructed for frictional engagement with an upper, optically effective surface 16 of the lens L. For the purposes of the present application, the securing member and the securing member adapter will be referred to generally below with the term securing member 18, while the clamping assembly will be referred to generally below with the term holding-down device 20.

The rotation angle position of the holding shafts 11, 12 rotatable in angularly controlled manner and thus of the lens L clamped therebetween may finally be detected by means of an angular position transducer 22, shown schematically in FIG. 1, for the angle of rotation φ, which transducer 22 is connected electrically on the output side with a control unit 24.

The workpiece driving and clamping device is associated with a lens edge-machining machine, not shown in any more detail, into the working chamber of which there project the holding shafts 10, 12. The lens edge-machining machine additionally comprises an edge machining device, likewise not shown here, which may be constructed in principle as described in the applicant's prior German patent application 101 14 239.0.

Figure 2:
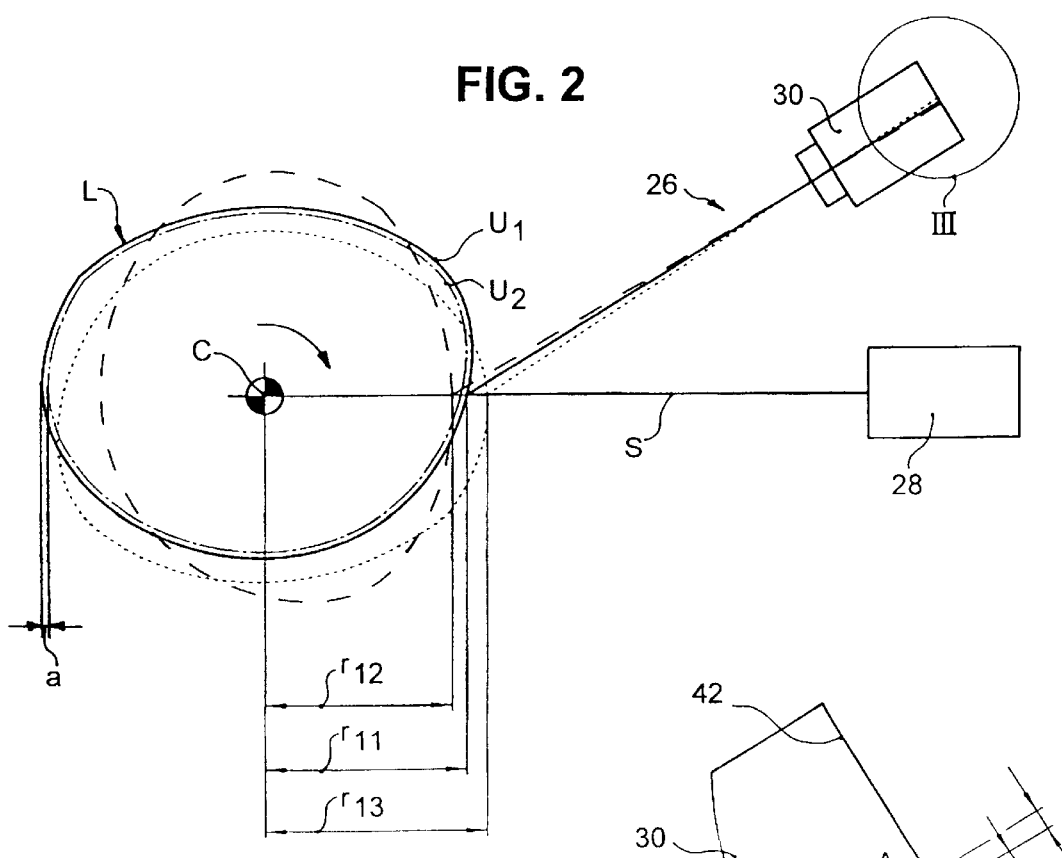
FIG. 2 shows a plan view of the measuring arrangement according to FIG. 1, which illustrates, inter alia, how radius values for the preliminarily machined spectacle lens are detected, wherein, to simplify the illustration relative to FIG. 1, only the preliminarily machined spectacle lens, the laser and the video camera are shown.

The edge-machining device has a first edge-machining tool located in the working chamber, which tool may be adjusted at least radially relative to the rotational axis C of the workpiece under CNC control (X axis) and serves to premachine the edge R of the lens L in such a way that the lens L is provided with a circumferential contour $U_1$ which corresponds to the circumferential contour of a holder for the lens L apart from slight oversizing a (see FIG. 2). Furthermore, the edge-machining device comprises a second edge-machining tool located in the working chamber, which is likewise adjustable under CNC control at least radially relative to the rotational axis C of the workpiece and serves to finish the edge R of the lens L in such a way that the lens L is provided with a circumferential contour $U_2$ substantially complementary to the circumferential contour of the holder. During finishing of the lens edge R a groove or bevel F may optionally be formed, to which end the second edge machining tool may also be adjusted under CNC control in a direction parallel to the rotational axis C of the workpiece (Z axis).

The edge-machining tools possible here, which are preferably rotationally driven tools, such as milling cutters or grinding wheels, the axes of rotation of which extend parallel to the rotational axis C of the workpiece, are sufficiently well known to the person skilled in the art and will not therefore be described in any more detail here. All that will be mentioned in this context is that the tools may also be combined into a combined tool, displaceable axially by means of the edge-machining device, with different, coaxially arranged machining portions, for instance milling, grinding and/or polishing portions. It is also feasible to use a turning chisel as edge-machining tool.

It should further be noted at this point, also on the subject of the structure of the lens edge-machining machine, that nozzles for supplying cooling liquid and/or compressed air may also be provided in the working chamber. During edge-machining of lenses L, it is fundamentally necessary to feed cooling liquid into the area between the lens L and the edge-machining tool, in order to cool tool and workpiece and to remove chips or abraded material. Only in the event of the edge-machining of plastics lenses may the supply of cooling liquid exceptionally be dispensed with. One or more nozzles for supplying compressed air may be provided, in order inter alia to dry at least the edge R of the lens L after preliminary machining thereof, as will be described in more detail below.

So that the edge R of the lens L may be measured in the clamped position in which machining of the edge R of the lens L is also performed, the lens edge-machining machine is finally equipped with a measuring arrangement 26 operating without contact.

The measuring arrangement 26 comprises a laser 28 and a video camera 30, which are both in a predetermined positional relationship with the rotational axis C of the workpiece and thus also in a predetermined positional relationship to one another. The laser 28 and the video camera 30, which lie approximately in one plane with the clamped lens L, are connected on the input side electrically with the control unit 24, such that the control unit 24 may selectively switch the laser 28 or the video camera 30 on and off. The video camera 30 is additionally connected on the output side to a signal processing device 32, which is electrically connected in turn with the control unit 24 and serves to process the image signal obtained from the video camera 30 in a manner known per se, so that it may be evaluated by the control unit 24.

So that the measuring arrangement 26 cannot become dirty, the laser 28 and the video camera 30 are preferably arranged outside the working chamber of the lens edge-machining machine behind transparent panels (not shown), which may optionally be covered with shutters (not shown), such that the panels cannot become dirty either during machining of the edge R of the lens L.

In the exemplary embodiment described here, the laser 28 is a Class 2 laser device to DIN EN 60825-1, which exhibits approx. 1 mW of power with a wavelength of between 650 and 700 nm. As FIGS. 1 and 2 show, the laser 28 is so constructed and oriented relative to the rotational axis C of the workpiece that a bundle of laser beams S directed towards the rotational axis C of the workpiece and indicated with dotted lines in FIG. 1 may be emitted which, upon impingement on the edge R of the lens L parallel to the rotational axis C of the workpiece when viewed in cross section or on the holding-down device 20, is shown as a vertically extending line. In other words, the laser beams S emitted by means of the laser 28 are located in an imaginary plane, which contains the rotational axis C of the workpiece.

The video camera 30 is aligned in such a way that it may record the point of impact, generally designated 34 in FIG. 1, of the bundle of laser beams S, fanning out in the exemplary embodiment shown, on the edge R of the lens L or on the holding-down device 20. To this end, the video camera 30 is spaced by a defined amount from the rotational axis C of the workpiece, while the optical axis of the video camera 30 forms an angle w with the plane of the laser beams S which is preferably between 30° and 60° and more preferably between 40° and 50°.

Finally, in FIG. 1 reference numeral 36 designates a lower rim of the lens edge R while 38 designates an upper rim of the lens edge R and 40 designates a visible upper rim of the holding-down device 20. These circumferential rims 36, 38 and 40 and the significance thereof for the process described here will be gone into in more detail below with reference to FIG. 4.

The measuring arrangement 26 operates according to a measuring principle which is known as laser triangulation and will be described below with reference to FIG. 2, insofar as is necessary for an understanding of the edge-machining process described in more detail below. As has already been mentioned, the point of impact 34 of the laser beams S emitted by the laser 28 is observed by means of the video camera 30, wherein an image of the point of impact 34 is focussed onto an imaging plane 42 of the video camera 30 by an optical system of the video camera 30. Each point of the image of the point of impact 34 formed on the imaging plane 42 of the video camera has a height coordinate and a width coordinate value, wherein, in the control unit 24, a particular height value z of the corresponding point of the point of impact 34 is assigned to each height coordinate value of the imaging plane 42 and a particular distance value r of the corresponding point of the point of impact 34 from the rotational axis C of the workpiece is assigned to each width coordinate value of the imaging plane 42. Assignment of the height and width coordinate values of the image of the point of impact 34 to the actual height or distance values z, r of the point of impact 34 is set by calibration of the measuring arrangement 26 by means of a grid matrix.

Figure 3:
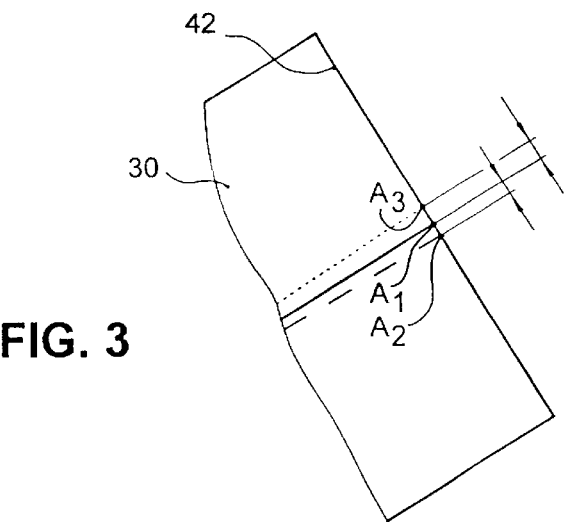
FIG. 3 is an enlarged representation of detail III of FIG. 2

FIGS. 2 and 3 illustrate this measurement principle by means of the distance or radius values r of the lens edge R from the rotational axis C of the workpiece. The lens L here has a circumferential contour $U_1$ other than circular, such that the distance r of the lens edge R from the rotational axis C of the workpiece varies from angular position to angular position of the lens L ($r_{11}$, $r_{12}$, $r_{13}$). In the angular position of the lens L shown with a continuous line, the laser beams S impinge on a point on the lens edge R which is recorded as a line image $A_1$ on the imaging plane 42 of the video camera 30. The line image $A_1$ has a width coordinate value to which the distance value $r_{11}$ is assigned in the control unit 24. If the lens L is then turned about the rotational axis C of the workpiece in the clockwise direction into the angular position shown by broken lines, the laser beams S impinge on a different point of the lens edge R, which is recorded on the imaging plane 42 of the video camera 30 as line image $A_2$. As FIG. 3 shows, the line image $A_2$ is displaced downwards by a certain amount relative to the line image $A_1$, such that the line image $A_2$ has a different width coordinate value from the line image $A_1$, to which the distance value $r_{12}$ is assigned in the control unit 24, which distance value $r_{12}$ is different from the distance value $r_{11}$ in accordance with the real conditions. In the case of further rotation of the lens L into the dotted angular position, the laser beams S again impinge on a different point of the lens edge R, which is shown on the imaging plane 42 of the video camera 30 as line image $A_3$. The line image A3 is displaced upwards by a certain amount relative to the line image $A_1$ in FIG. 3 and consequently again has a different width coordinate value from the line image $A_1$, to which the distance value $r_{13}$ is assigned in the control unit 24. It is obvious that the distance r($\phi$) between the point of impact 34 of the laser beams S for example on the lens edge r and the rotational axis C of the workpiece may thus be determined for each angular position of the lens L.

Determination of the height values z($\phi$) of the point of impact of the laser beams S proceeds in a similar manner in a plane rotated by 90° relative to the illustration plane of FIG. 3, wherein, for example, the line image, recorded on the imaging plane 42 of the video camera 30, of the point of impact of the laser beams S on the lens edge R is longer or shorter depending on the thickness of the lens edge R which varies over the circumference of the lens L. Here too, each point of the line image on the imaging plane 42 of the video camera 30 has a height coordinate value to which a certain height value z of the point of impact 34 of the laser beams S is assigned in the control unit 24 in accordance with the real conditions.

The course of the edge-machining process may be roughly subdivided into three or four stages, namely preliminary machining of the lens edge R, optional drying of the preliminarily machined lens edge R, contactless measuring of the preliminarily machined lens edge R and then finishing of the lens edge R taking account of the detected edge data of the preliminarily machined lens L.

First of all, the edge R of the lens L is preliminarily machined by means of the first edge-machining tool in accordance with the data stored or calculated in the control unit 24, wherein the lens L contains the circumferential contour $U_1$ shown in FIG. 2, which contour corresponds to the circumferential contour of the holder for the lens L apart from the slight oversizing a. The essential feature here is that, during preliminary machining of the edge R of the lens L, a surface which is definedly matt when in the dry state is provided at the edge R, a fact which has proven important for the precision and speed of the measuring stage. Tests by the applicant have shown that such a definedly matt surface of the lens edge R exhibits an average surface roughness Rz to DIN 4768 of approx. 4.5 to 11 $\mu$m and may be produced in particular by means of a milling cutter or a grinding wheel. It has emerged that the defined mattness of the surface of the lens edge R ensures that, in the case of measurement by means of the above-described measuring arrangement 26, a sufficient proportion of the laser beams S is reflected from the point of impact 34 into the video camera 30, while the laser beams S do not penetrate too far into the lens edge R, which would "blur" the image of the point of impact 34 recorded on the imaging plane 42 of the video camera 30. In other words, the surface of the lens edge R thus has roughly the reflection properties of a good projection wall for slide or film projection.

If preliminary machining of the lens edge R took place, as is in fact conventional, with cooling liquid supply, in the next process stage at least the edge R of the preliminarily machined lens L is dried after the supply of cooling liquid has been turned off and before the edge R is measured, so that any cooling liquid residues left on the lens edge R cannot cause the surface to shine, which would be detrimental to measuring accuracy and speed.

It would in principle be possible to wipe the lens edge R to dry it. However, it is preferable for the lens edge R to be dried by means of the edge-machining tool and/or by supplying compressed air. As far as drying by means of the edge-machining tool is concerned, two alternative procedures are provided depending on the material of the lens L. In the case of lens materials which may be machined in a dry state (plastics), the edge-machining tool is adjusted radially relative to the rotational axis C of the workpiece in such a way that it comes into machining engagement with the edge R of the lens L with a very slight, substantially constant penetration depth, while the lens L is turned as during the actual edge machining or more quickly. As a result of dry machining engagement, heating occurs in the area of engagement between edge-machining tool and lens L, which dries the edge R of the lens L. In the case of lens materials which cannot be machined dry (inorganic glass), the edge-machining tool is driven at a high rotational speed and is adjusted in the radial direction relative to the rotational axis C of the workpiece in such a way that a gap with a small gap width remains between the edge-machining tool and the edge of the lens L, while the lens L is rotated as during actual edge machining or faster. In this case, the edge-machining tool operates virtually as a fan directed at the lens edge R for drying purposes. Alternatively or in addition to the above-described procedure for drying the lens edge R using the edge-machining tool, compressed air may also be blown at the edge R of the lens L by means of one or more nozzles, while the lens L is rotated as during actual edge machining or faster.

For contactless measurement of the edge R of the preliminarily machined lens L, first of all the shutters on the laser 28 and the video camera 30 are opened, such that a bundle of laser beams S may be directed by means of the laser 28 towards the dry, definedly matt surface of the lens edge R. It should be mentioned in this connection that the laser 28 is constantly switched on during operation of the lens edge-machining machine, so that time is not lost unnecessarily during measuring due to warming-up of the laser 28. By means of the video camera 30, an image of the point of impact 34 of the laser beams S is recorded as described above.

The lens L preliminarily machined at the edge R is then rotated in an angular step from one measuring position to the next measuring position, until the lens L has performed a complete revolution. The lens L is preferably moved on from measuring position to measuring position in equal angular steps, wherein the number of angular steps is even.

The image recorded by the video camera 30 in each measuring position is evaluated with regard to the distance $r(\phi)$ between the point of impact 34 of the laser beams S and the rotational axis C of the workpiece and optionally to height values $z(\phi)$ of the point of impact 34, in order to determine the edge data of the preliminarily machined lens L. If the lens L is not to be provided with any bevel F or groove at the edge R during finishing, an evaluation of the images recorded by the video camera 30 with regard to height values $z(\phi)$ of the point of impact 34 may be dispensed with. For finishing of the lens edge R, it is sufficient to know the distance values $r_1(\phi)$ of the edge R of the preliminarily machined lens L from the rotational axis C of the workpiece, from which the circumference of the lens L at the edge R may be calculated.

Figure 4:
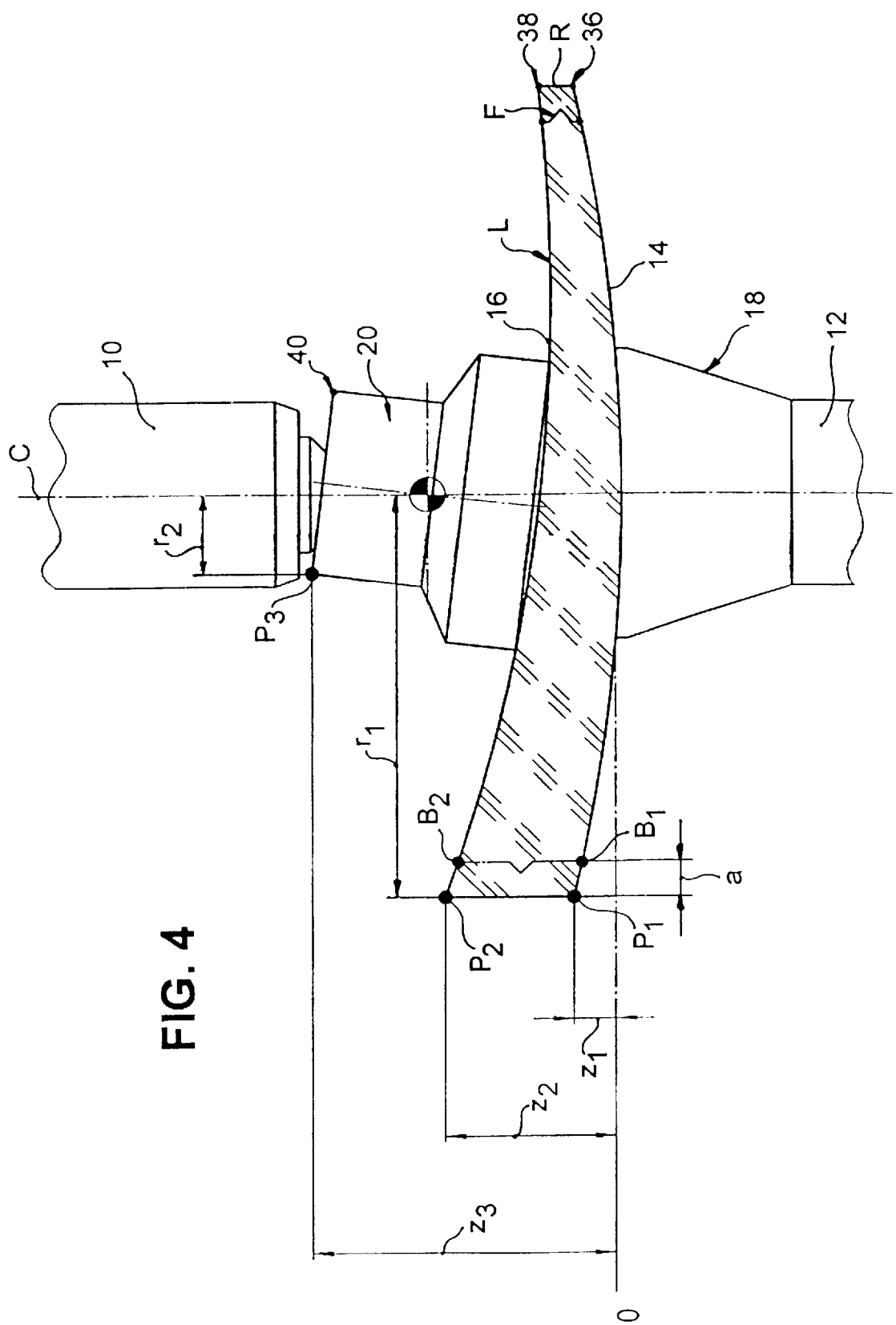
FIG. 4 is a partially sectional side view of the preliminarily machined spectacle lens clamped between the two holding shafts of FIG. 1, which view illustrates, inter alia, how height values for the preliminarily machined spectacle lens are detected, wherein the preliminarily machined spectacle lens is shown cut in a plane extending through the rotational axis of the workpiece.

If a bevel F or groove is to be formed at the edge R during finishing of the lens L, the course or run of which bevel F or groove at the edge R is to be calculated prior to finishing in a manner known per se, it is necessary to know at least approximately not only the radius values $r_1(\phi)$ but also the height profile $z_1(\phi)$ of the lower lens rim 36, the height profile $Z_2(\phi)$ of the upper lens rim 38 and the curvatures $K_1(\phi)$, $K_2(\phi)$ of both optically effective surfaces 14, 16 of the lens L. To this end, in each measuring position of the lens L clamped between the securing member 18 and the holding-down device 20, the angle of rotation $\phi$ of the lens L is detected by means of the angular position transducer 22 and the heights $z_1(\phi)$ and $z_2(\phi)$ of the lower rim 36 or the upper rim 38 of the edge R of the lens L relative to a bearing point of the lens L against the securing member 18, the distance $r_1(\phi)$ of the edge R of the lens L from the rotational axis C of the workpiece, the height $z_3(\phi)$ of the upper rim 40 of the holding-down device 20 relative to the bearing point of the lens L against the securing member 18 and the distance $r_2(\phi)$ of the upper rim 40 of the holding-down device 20 from the rotational axis C of the workpiece are detected by means of the measuring arrangement 26. In other words, the image recorded by the video camera 30 of the point of impact 34 of the laser beams S in each measuring position of the lens L when viewed in section according to FIG. 4 is evaluated with regard to the height and radius values $z_1(\phi)$, $z_2(\phi)$, $z_3(\phi)$ $r_1(\phi)$ and $r_2(\phi)$ of measurement points $P_1$, $P_2$ and $P_3$ on the lower lens rim 36, the upper lens rim 38 or the upper rim 40 of the holding-down device 20.

While the distance profile $r_1(\phi)$ of the lens edge R from the rotational axis C of the workpiece and the height profiles $z_1(\phi)$ and $z_2(\phi)$ of the lower lens rim 36 or of the upper lens rim 38 result directly from the values thus obtained, the curvatures $K_1(\phi)$, $K_2(\phi)$ of the optically effective surfaces 14, 16 of the lens L have still to be calculated. The curvature $K_1(\phi)$ of the lower optically effective surface 14 of the lens may be determined from the known bearing point of the lens L against the securing member 18 and the position of the measurement points $P_1$ on the lower lens rim at diametrically opposite measuring positions. To calculate the curvature $K_2(\phi)$ of the upper optically effective surface 16 of the lens L, use is made not only of the position of the measuring points $P_2$ on the upper lens rim 38 at diametrically opposite measuring positions but also of the position of the measuring points $P_3$ on the upper rim 40 of the holding-down device 20 at the same measuring position, wherein the position of the measurement points $P_3$ provide information about the angular position of the holding-down device 20 and thus about the bearing points thereof against the upper optically effective surface 16.

The course or run of the bevel F or groove on the edge R of the finished lens L may then be calculated, taking account of the curvatures $K_1(\phi)$, $K_2(\phi)$ of the optically effective surfaces 14, 16 of the lens L, before the lens L is finish-machined with formation of the bevel F or groove in accordance with the calculated course or run for the bevel F or groove. On the basis of the detected profile of the lower rim 36 and the upper rim 38 of the edge R of the preliminarily machined lens L, taking account of the known oversizing a and the calculated curvatures $K_1(\phi)$, $K_2(\phi)$ of the optically effective surfaces 14, 16, conclusions may be drawn as to the profile of the lower rim and upper rim of the edge of the finished lens, which is indicated in FIG. 4 by the calculated points $B_1$ and $B_2$. The bevel F or groove has then to be positioned in a manner known per se between the calculated lower rim and the calculated upper rim of the edge of the finished lens.

After closure of the shutters for the laser 28 and the video camera 30, finish-machining of the edge R of the lens L is finally performed in a manner known per se and therefore not described in any more detail, taking account of the detected edge data of the preliminarily machined lens L, by means of the second edge-machining tool, wherein the lens L is provided with the circumferential contour $U_2$ shown in FIG. 2, which is substantially complementary to the circumferential contour of the holder. As already mentioned, a bevel F or groove may also be formed at the lens edge R.

Although it has been described above that the workpiece driving and clamping device and the measuring arrangement are components of a lens edge-machining machine, it is naturally also feasible for these devices to be components of a separate measuring machine, which serves to detect the edge data of a lens as described above.

In summary, a process is disclosed for edge-machining of an optical lens, in particular a spectacle lens, having the stages: preliminary machining of the edge of the lens rotatable in an angularly controlled manner about a rotational axis of the workpiece by means of a first edge-machining tool adjustable radially relative to the rotational axis of the workpiece, wherein the lens is provided with a circumferential contour which corresponds to the circumferential contour of a lens holder apart from a slight degree of oversizing, contactless measurement of the preliminarily machined lens edge and finish-machining of the lens edge, taking account of the detected edge data of the preliminarily machined lens by means of a second edge-machining tool adjustable radially relative to the rotational axis of the workpiece, wherein the lens is provided with a circumferential contour substantially complementary to the circumferential contour of the lens holder. According to the invention, during preliminary machining of the lens edge, an edge surface which is definedly matt in the dry state is produced and then the dry or dried surface is measured by means of a measuring arrangement comprising a laser and a video camera and operating in a particular way without contact, in order to determine the edge data of the preliminarily machined lens with increased accuracy and markedly more quickly than was previously possible.

We claim:

1. A method of edge-machining an edge of an optical lens, which is rotatable in an angularly controlled manner about a rotational axis of a workpiece to form the lens, the method comprising the steps:

preliminary machining of the edge of the lens by means of a first edge-machining tool that is adjustable at least radially relative to the rotational axis of the workpiece, wherein the lens is provided with a circumferential contour which corresponds to a circumferential contour of a holder for the lens apart from a slight degree of oversizing, contactless measurement of the edge of the preliminarily machined lens, and finish-machining of the edge of the lens, taking account of the detected edge data for the preliminarily machined lens, by means of a second edge-machining tool that is adjustable at least radially relative to the rotational axis of the workpiece, wherein the lens is provided with a circumferential contour substantially complementary to the circumferential contour of the holder, wherein, during preliminary machining of the edge of the lens, a surface which is definedly matt in the dry state is produced at the edge, wherein, when preliminary machining of the edge of the lens is performed with cooling liquid supply, at least the edge of the preliminarily machined lens is dried before the edge is measured, and wherein, to measure the edge, a bundle of laser beams is directed towards the dry, definedly matt surface of the edge by means of a laser in a predetermined positional relationship to the rotational axis of the workpiece, and an image of the point of impact of the laser beams is recorded by means of a video camera in a predetermined positional relationship to the rotational axis of the workpiece, wherein the recorded image is then evaluated with respect to a distance of the point of impact from the rotational axis of the workpiece, in order to determine the edge data of the preliminarily machined lens.

2. A method according to claim 1, wherein the recorded image is evaluated additionally with regard to height values of the point of impact in order to determine the edge data of the preliminarily machined lens.

3. A method according to claim 1, wherein the preliminary machining of the edge of the lens is performed in such a way by means of a milling cutter that the surface of the edge is provided with an average surface roughness (Rz) of 4.5 to 11 μm.

4. A method according to claim 1, wherein the preliminary machining of the edge of the lens is performed in such a way by means of a grinding wheel that the surface of the edge is provided with an average surface roughness (Rz) of 4.5 to 11 μm.

5. A method according to claim 1, wherein, to dry the edge of the preliminarily machined lens, the supply of cooling liquid is turned off and then the edge-machining tool is adjusted radially relative to the rotational axis of the workpiece in such a way that it enters into machining engagement with the edge of the lens with a very slight, substantially constant penetration depth while the lens is rotated.

6. A method according to claim 1, wherein, to dry the edge of the preliminarily machined lens, the supply of cooling liquid is turned off and then the edge-machining tool is adjusted radially relative to the rotational axis of the workpiece in such a way that a gap with a small gap width remains between the edge-machining tool and the edge of the lens, while the lens is rotated.

7. A method according to claim 1, wherein, to dry the edge of the preliminarily machined lens, the supply of cooling liquid is turned off and then air is blown at the edge of the lens by means of at least one nozzle while the lens is rotated.

8. A method according to claim 1, wherein, to measure the edge of the preliminarily machined lens, the lens is rotated by a number of angular steps from a first measuring position to a next measuring position until the lens has performed a complete revolution.

9. A method according to claim 8, wherein the lens is rotated by uniform angular steps from measuring position to measuring position.

10. A method according to claim 8, wherein the number of angular steps is even.

11. A method according to claim 8, wherein the lens is clamped between a securing member and a holding-down device, and wherein an angle of rotation of the lens, heights of a lower rim and an upper rim of the edge of the lens relative to a bearing point of the lens against the securing member, a distance of the edge of the lens from the rotational axis of the workpiece, a height of an upper rim of the holding-down device relative to the bearing point of the lens against the securing member and a distance of the upper rim of the holding-down device from the rotational axis of the workpiece are detected in each measuring position of the lens.

12. A method according to claim 11, wherein the lens has two optically-effective surfaces, and wherein the curvatures of both optically effective surfaces of the lens are calculated by means of the height and distance values detected for a lens cross-section extending through the rotational axis of the workpiece.

13. A method according to claim 12, wherein a run of a bevel on the edge of the finished lens is calculated, taking into account the curvatures of the optically effective surfaces of the lens, before the lens is finish-machined with formation of the bevel in accordance with the calculated run for the bevel.

14. A method according to claim 12, wherein a run of a groove on the edge of the finished lens is calculated, taking into account the curvatures of the optically effective surfaces of the lens, before the lens is finish-machined with formation of the groove in accordance with the calculated run for the groove.

* * * * *